US012727680B2

(12) United States Patent
Chinomi

(10) Patent No.: US 12,727,680 B2
(45) Date of Patent: Sep. 8, 2026

(54) COVER FASTENING CLIP

(71) Applicant: NIFCO INC., Yokosuka (JP)

(72) Inventor: Yuhei Chinomi, Yokosuka (JP)

(73) Assignee: NIFCO INC., Yokosuka (JP)

( * ) Notice: Subject to any disclaimer, the term of this patent is extended or adjusted under 35 U.S.C. 154(b) by 230 days.

(21) Appl. No.: 18/694,247

(22) PCT Filed: Oct. 24, 2022

(86) PCT No.: PCT/JP2022/039582
§ 371 (c)(1), (2) Date: Mar. 21, 2024

(87) PCT Pub. No.: WO2023/095509
PCT Pub. Date: Jun. 1, 2023

(65) Prior Publication Data

US 2024/0382013 A1 Nov. 21, 2024

(30) Foreign Application Priority Data

Nov. 25, 2021 (JP) ................................ 2021-191596

(51) Int. Cl.
*A47C 31/02* (2006.01)
*B60R 13/02* (2006.01)

(52) U.S. Cl.
CPC ........ *A47C 31/026* (2013.01); *B60R 13/0206* (2013.01)

(58) Field of Classification Search
CPC ... A47C 31/026; A47C 31/02; B60R 13/0206; F16B 21/073; B68G 7/052
See application file for complete search history.

(56) References Cited

U.S. PATENT DOCUMENTS 8,690,257 B2 4/2014 Stiller et al.
9,896,008 B2 * 2/2018 Sato ..................... B60N 2/5825
10,052,986 B2 * 8/2018 Sato .................... B29C 45/0025
(Continued)

FOREIGN PATENT DOCUMENTS

JP 2016-186324 A 10/2016
JP 6345143 B2 6/2018
(Continued)

OTHER PUBLICATIONS

PCT/ISA/210, "International Search Report for PCT International Application No. PCT/JP2022/039582," Dec. 27, 2022.

*Primary Examiner* — David M Upchurch
(74) *Attorney, Agent, or Firm* — HAUPTMAN HAM, LLP

(57) ABSTRACT

A cover fastening clip includes a plate-shaped base portion configured to be embedded in a foam body and held in the foam body; a pair of extension portions provided at interval in a width direction of the base portion and extending in a thickness direction of the base portion; fastening portions, each being provided at each tip of the pair of extension portions, configured to fasten a fastened portion provided at a cover for covering the foam body; and support portions, each extending from each of the extension portions outward in the width direction of the base portion, contacting the base portion to support the extension portions when the extension portions are bent outward in the width direction.

5 Claims, 15 Drawing Sheets

(56) References Cited

U.S. PATENT DOCUMENTS

| | | | | |
|---|---|---|---|---|
| 11,724,626 | B2 * | 8/2023 | Aoki | B60N 2/6027 297/452.6 |
| 2007/0011853 | A1 | 1/2007 | Smith | |
| 2010/0117434 | A1 * | 5/2010 | Galbreath | B60N 2/5825 297/452.58 |
| 2012/0174352 | A1 * | 7/2012 | Tsunoda | B60N 2/5825 24/530 |
| 2012/0216376 | A1 * | 8/2012 | Galbreath | B60N 2/5825 24/457 |
| 2015/0132422 | A1 * | 5/2015 | Yamada | B60N 2/5891 425/110 |
| 2016/0280105 | A1 * | 9/2016 | Sato | B60N 2/5825 |
| 2019/0275918 | A1 | 9/2019 | Mayumi et al. | |
| 2021/0053472 | A1 * | 2/2021 | Eldridge | A47C 31/023 |
| 2022/0151394 | A1 * | 5/2022 | Chinomi | A47C 31/023 |
| 2023/0085792 | A1 * | 3/2023 | Chinomi | B60N 2/6027 24/289 |

FOREIGN PATENT DOCUMENTS

| | | | |
|---|---|---|---|
| JP | 2019-138471 | A | 8/2019 |
| WO | 2021/177405 | A1 | 9/2021 |

* cited by examiner 112A,122A
116,126
117,127
L2
118
118A
118A
34
(30)
34
(30)
32
(30)
32
(30)
36
36
40
40
42
42
44
44
25
25
22A
22A
24C(24)
24C(24)
20
22
112B,122B
H
W 112A,122A
116,126
112B,122B
H
W
20
22
22A
24C(24)
25
30
32
(30)
34
36
40
42
44

COVER FASTENING CLIP

FIELD OF THE INVENTION

The present disclosure relates to a cover fastening clip.

BACKGROUND OF THE INVENTION

Japanese Patent No. 6345143 discloses a cover fastening clip. This cover fastening clip is disposed in the interior of a pad (foam body) of a seat, and is engaged with a suspender attached to a cover material (cover) covering the pad of the seat to secure the pad to the cover material.

SUMMARY

Technical Problem

In the cover fastening clip described in Japanese Patent No. 6345143, when extension portions are pressed and elastically deformed during roller crushing of a pad, projections provided on the extension portions contact upstanding portions standing on a base portion, thereby preventing plastic deformation (damage) of the extension portions.

In addition, the cover fastening clip described above is provided with a pair of notches in the edge of the base portion held in the foam body. When a force acts on the cover fastening clip to get out of the foam body, the vicinity of the pair of notches in the base portion is deformed and twisted to prevent the base portion from getting out of the foam body. Unfortunately, it is desired in the market to further prevent the cover fastening clip from getting out of the foam body.

The present disclosure aims at preventing damages of a cover fastening clip disposed in the interior of a foam body, and preventing the cover fastening clip from getting out of the foam body during roller crushing of the foam body as compared to a configuration in which portions for preventing deformation of extension portions are formed on a base portion held in the foam body.

Solution to Problem

A cover fastening clip according to an aspect of the present disclosure includes a plate-shaped base portion configured to be embedded in a foam body and held in the foam body; a pair of extension portions provided at interval in a width direction of the base portion and extending in a thickness direction of the base portion; fastening portions, each being provided at each tip of the pair of extension portions, configured to fasten a fastened portion provided at a cover for covering the foam body; and support portions, each extending from each of the extension portions outward in the width direction of the base portion, contacting the base portion to support the extension portions when the extension portions are bent outward in the width direction.

Advantageous Effects of Invention

According to the present disclosure, a cover fastening clip disposed in the interior of a foam body can prevent damage during roller crushing of the foam body, and prevent getting out of the foam body as compared to a configuration in which portions for preventing deformation of extension portions stand on a base portion held in the foam body.

BRIEF DESCRIPTION OF DRAWINGS

FIG. 13 is a front view illustrating a clip of an embodiment of the present disclosure.

DESCRIPTION OF EMBODIMENTS

Figure 1:
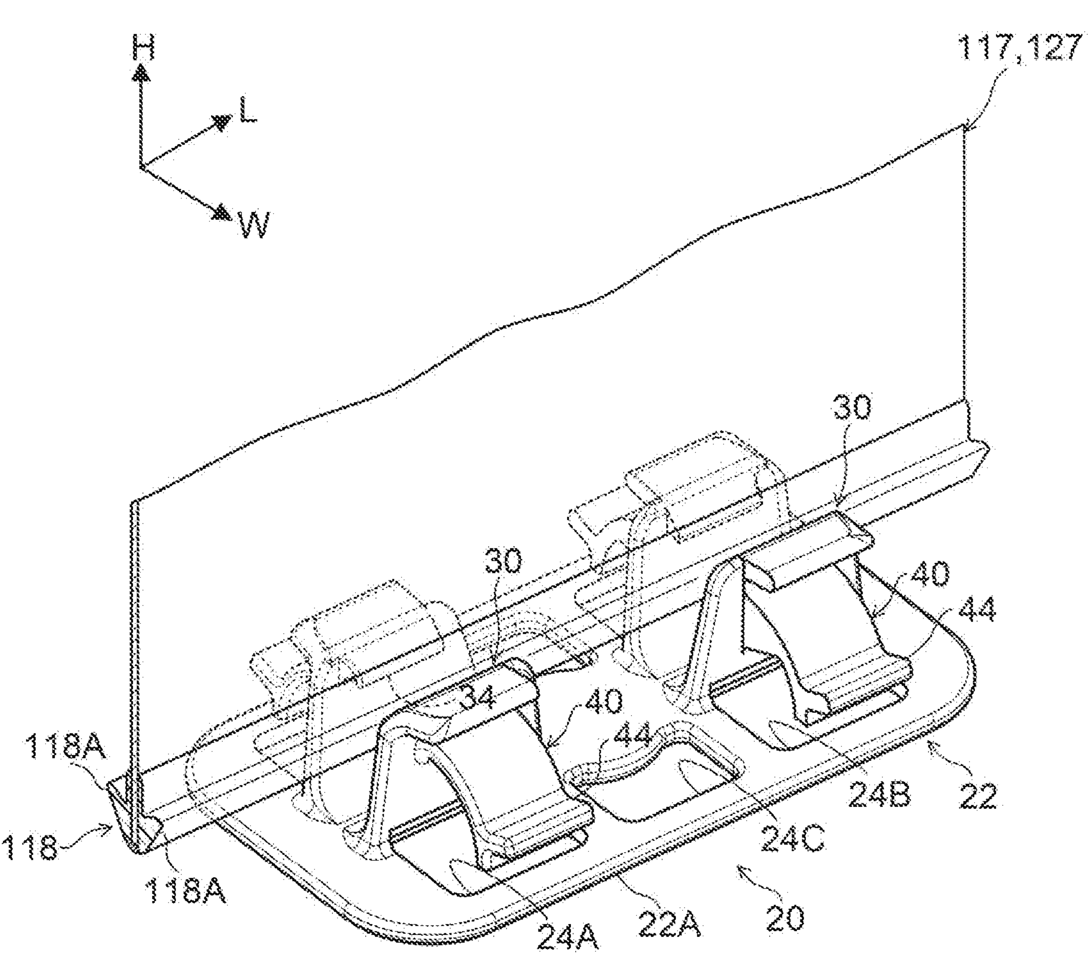
FIG. 1 is a perspective view illustrating a clip of an embodiment of the present disclosure.

An exemplary cover fastening clip according to an embodiment of the present disclosure will now be described with reference to FIGS. 1 to 15. In the drawings, the arrow H illustrates an up-down direction of the clip, the arrow W illustrates a width direction of the clip, and the arrow L illustrates a front-back direction of the clip.

Figure 15:
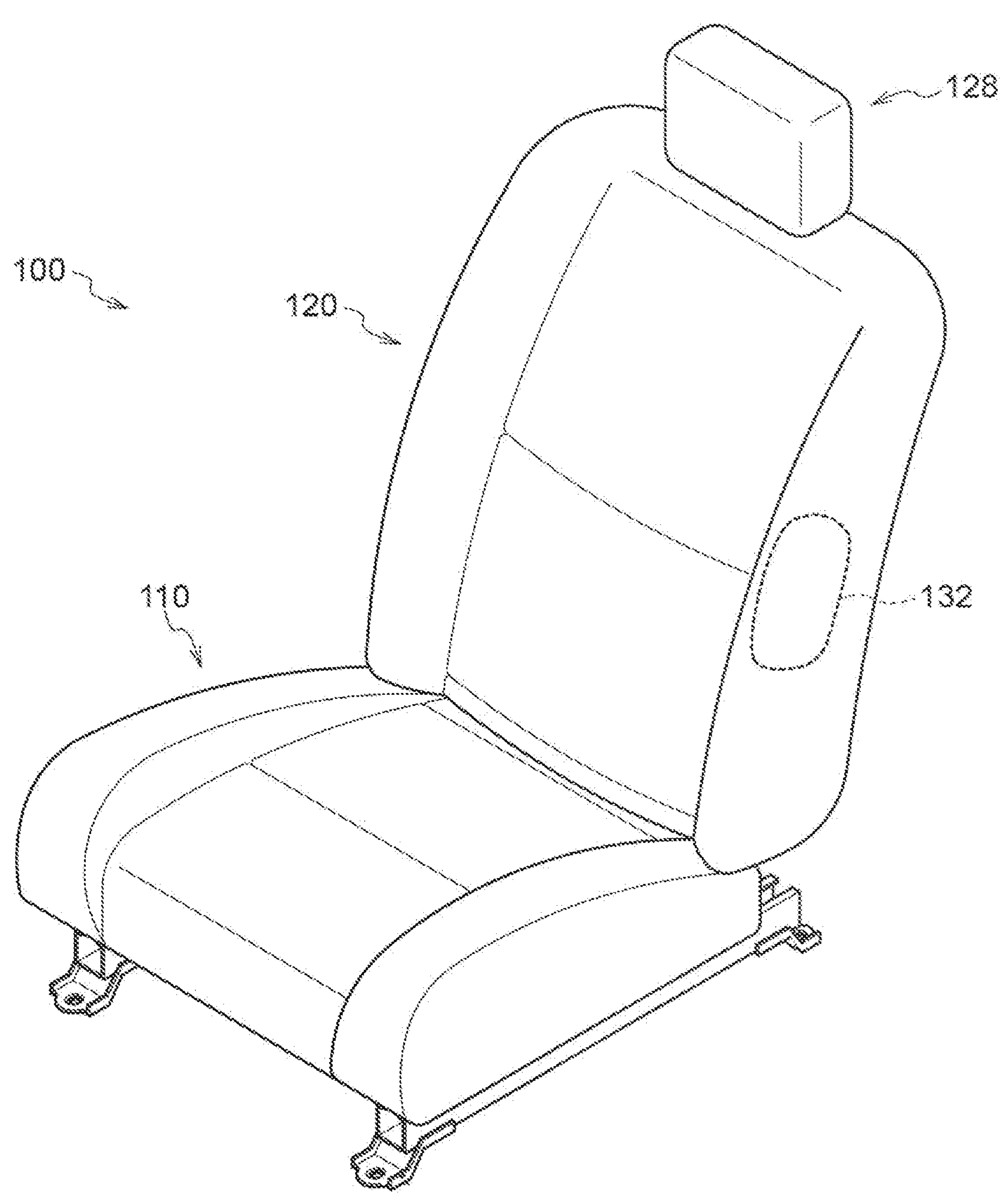
FIG. 15 is a perspective view illustrating a seat in which clips of an embodiment of the present disclosure are used.

First, a seat 100 for a vehicle provided with a cover fastening clip 20 (hereafter, merely "clip 20") will be described. As illustrated in FIG. 15, the seat 100 includes a cushion portion 110 supporting the buttocks, a back portion 120 supporting the back and lumbar, and a headrest 128 supporting the head of an occupant.

Figure 14:
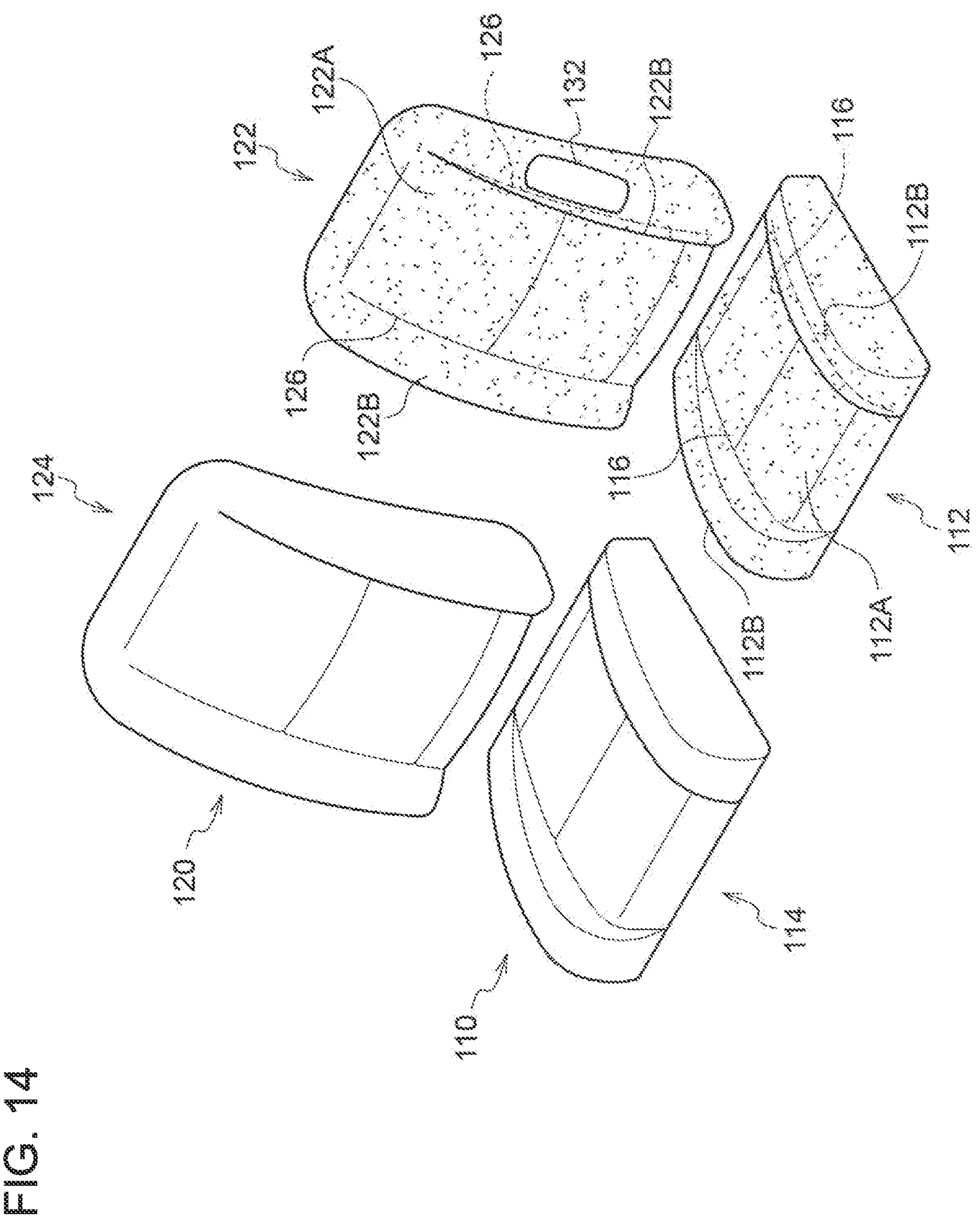
FIG. 14 is an exploded perspective view illustrating a seat in which clips of an embodiment of the present disclosure are used.

As illustrated in FIG. 14, the cushion portion 110 includes a cushion 112 as an example of a foam body, and a cover 114. The cushion 112 includes a main portion 112A and a pair of supporting portions 112B disposed so as to sandwich the main portion 112A from the width direction.

Grooves 116 are formed between each of the supporting portions 112B and the main portion 112A, and clips 20 are disposed at the bottoms of the grooves 116. Specifically, when the cushion 112 is foam-molded, the clips 20 are inserted into a mold to dispose the clips 20 at the bottoms of the grooves 116 (see FIG. 4).

Figure 7:
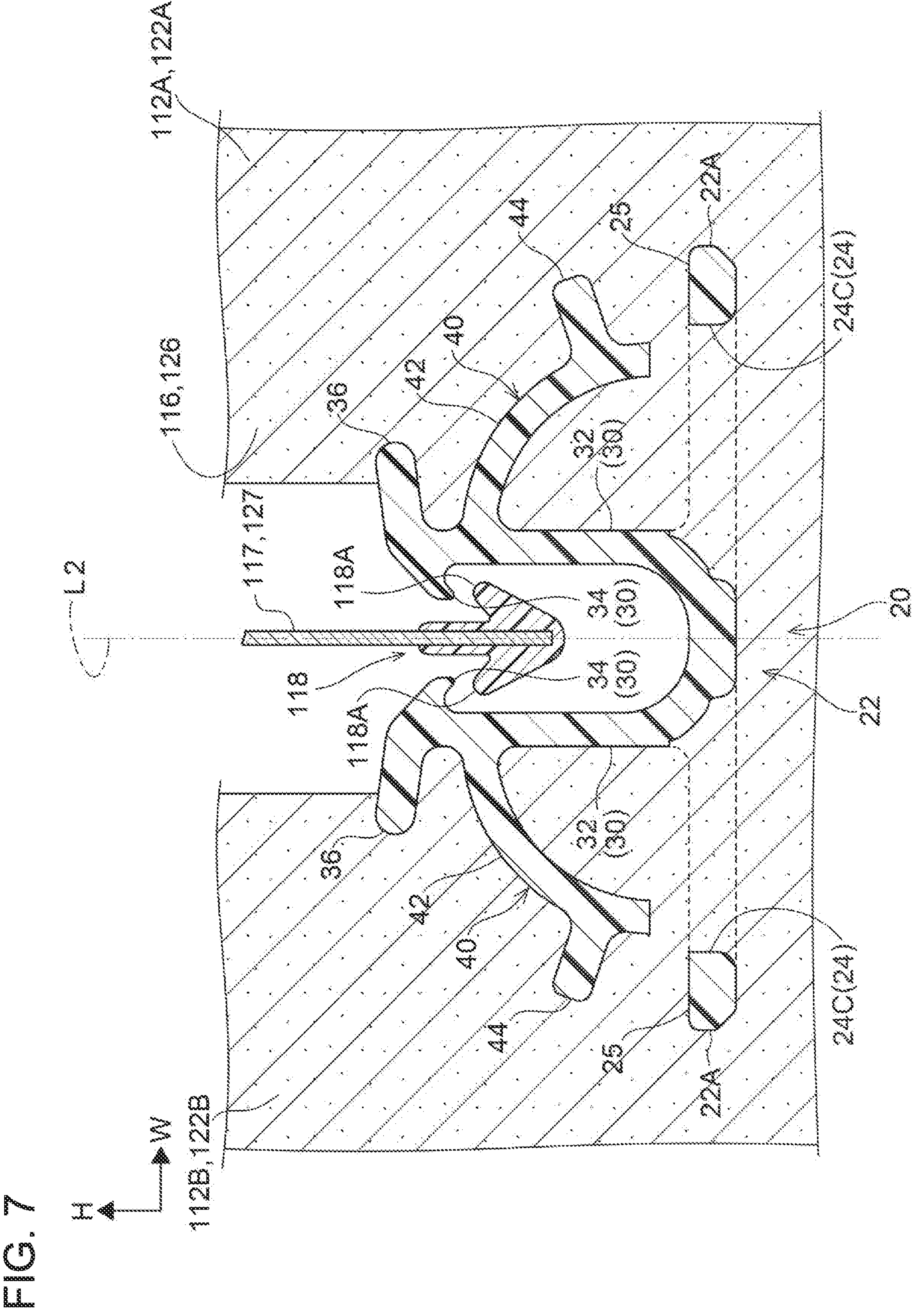
FIG. 7 is a sectional view illustrating a clip of an embodiment of the present disclosure.

A suspender 118, as an example of a fastened portion fixed to a sheet member 117 having a sheet-like shape attached to the cover 114, is then attached to the clip 20 (see FIG. 7). The suspender 118 and the clip 20 will be described below in detail.

Similarly, as illustrated in FIG. 14, the back portion 120 includes a cushion 122 (an example of the foam body) and a cover 124. The cushion 122 includes a main portion 122A and a pair of supporting portions 122B disposed so as to sandwich the main portion 122A from the width direction.

Grooves 126 are formed between each of the supporting portions 122B and the main portion 122A, and clips 20 are disposed at the bottoms of the grooves 126. Specifically, when the cushion 122 is foam-molded, the clips 20 are inserted into a mold to dispose the clips 20 at the bottoms of the grooves 126 (see FIG. 4).

A side airbag 132 (hereafter, merely “airbag”) is disposed in one of the supporting portions 122B. The cover 124 has a slit (illustration is omitted) formed to discharge the airbag 132 outward when the airbag 132 is deployed.

A suspender 118, as an example of a fastened portion fixed to a sheet member 127 attached to the cover 124, is then attached to the clip 20 (see FIG. 7). The suspender 118 and the clip 20 will be described below in detail.

The suspenders 118 extend along the bottoms of the grooves 116, 126 (in other words, extend in the depth direction of the page of FIG. 7) and, as illustrated in FIG. 7, are each tapered at the tip side. A pair of projections 118A projecting outward (i.e., in the left-right direction in FIG. 7) is formed at the base end side of the suspender 118.

<Clip>

Figure 9:
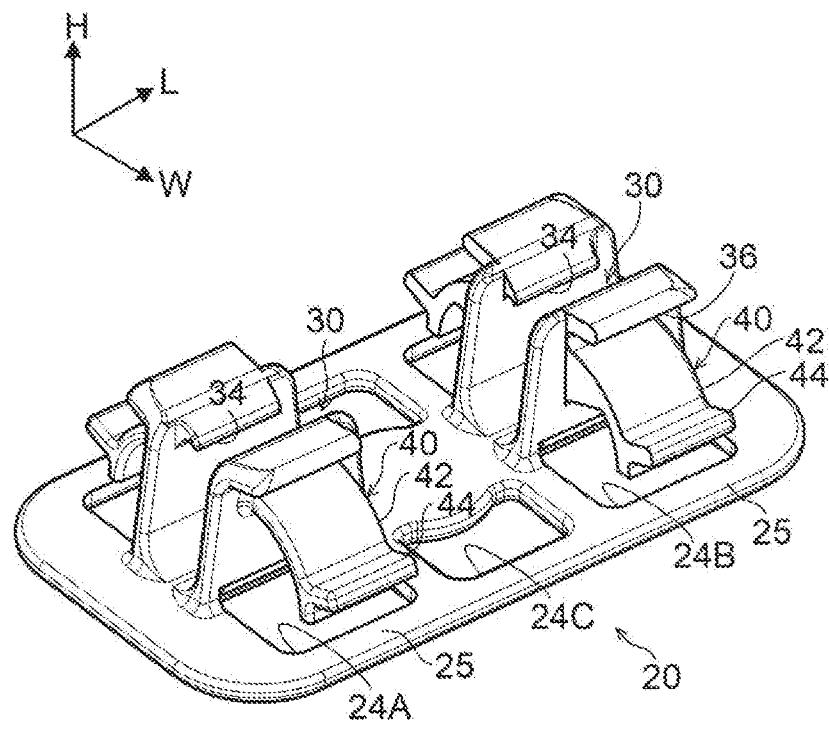
FIG. 9 is a perspective view of a clip of an embodiment of the present disclosure as viewed from above.

As illustrated in FIG. 9, the clip 20 includes a base portion 22, holding portions 30, and support portions 40. The base portion 22 and the holding portions 30 are integrally formed from a resin material. In other words, the clip 20 according to the present embodiment is an integrally formed article of a resin. As described above, a plurality of clips 20 is each disposed at the bottom of the groove 116 of the cushion 112 and the bottom of the groove 126 of the cushion 122.

(Base Portion)

In the clip 20, the base portion 22 is a portion embedded in the cushions 112, 122 and held in the cushions 112, 122, respectively. The base portion 22 has a plate shape. Specifically, the base portion 22 is a rectangular plate whose corners are curved into an arc shape.

Figure 10:
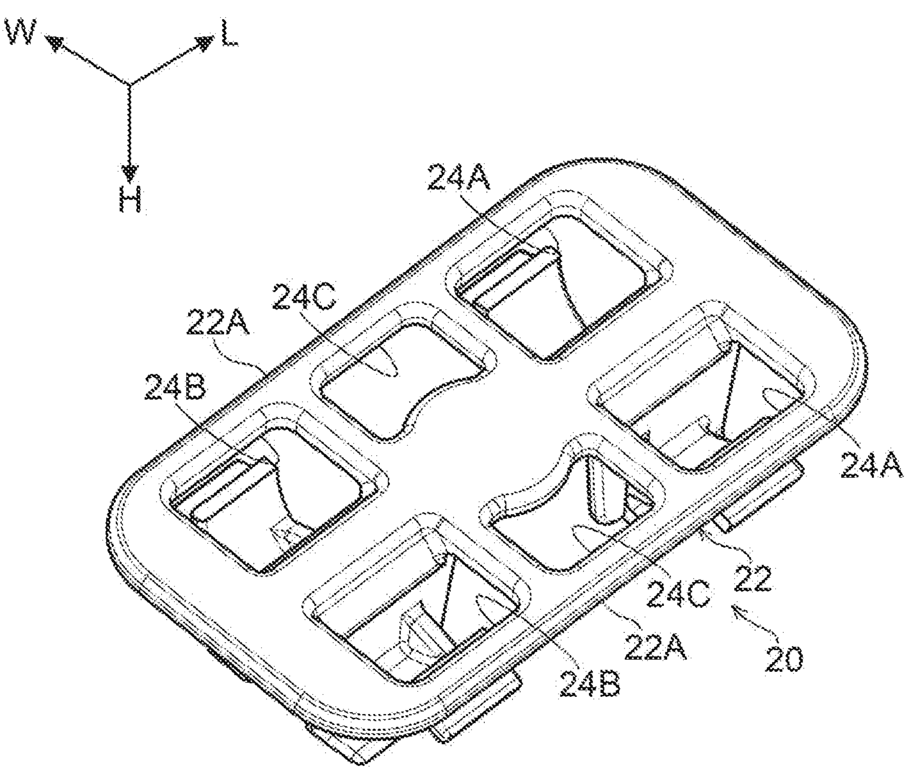
FIG. 10 is a perspective view of a clip of an embodiment of the present disclosure as viewed from below.

As illustrated in FIGS. 9 and 10, the base portion 22 has three through holes 24 aligned in the front-back direction along one of edges 22A and three through holes 24 aligned in the front-back direction along the other edge 22A. That is, these through holes 24 are formed in a plurality of rows in the width direction, aligned in the front-back direction. In the present embodiment, the through holes 24 are formed in two rows in the width direction, aligned in the front-back direction. The foam body enters the through holes 24 (see FIG. 7) during foam-molding of the cushions 112, 122 (see FIG. 14). This allows the base portion 22 of the clip 20 to be embedded in the cushions 112, 122 and held in the cushions 112, 122, respectively.

Figure 4:
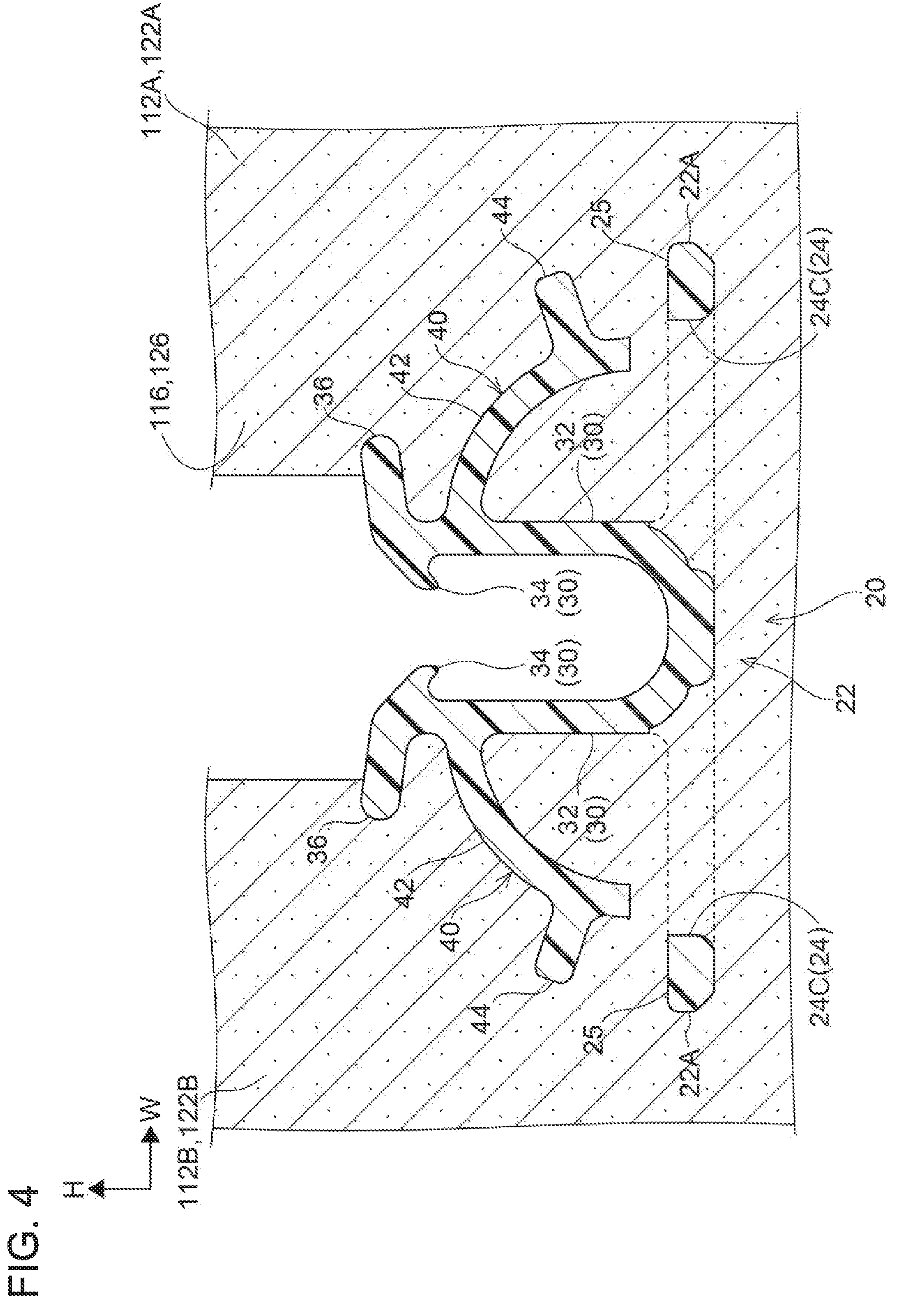
FIG. 4 is a sectional view illustrating a clip of an embodiment of the present disclosure.

In a state where the clips 20 are held in the cushions 112, 122, as illustrated in FIG. 4, their base portions 22 are disposed so as to extend along the bottoms of the grooves 116, 126 of the cushions 112, 122, respectively. In other words, the direction in which the groove 116 extends is the front-back direction of the clip 20 held in the cushion 112, and the direction in which the groove 126 extends is the front-back direction of the clip 20 held in the cushion 122.

(Holding Portion)

Figure 3:
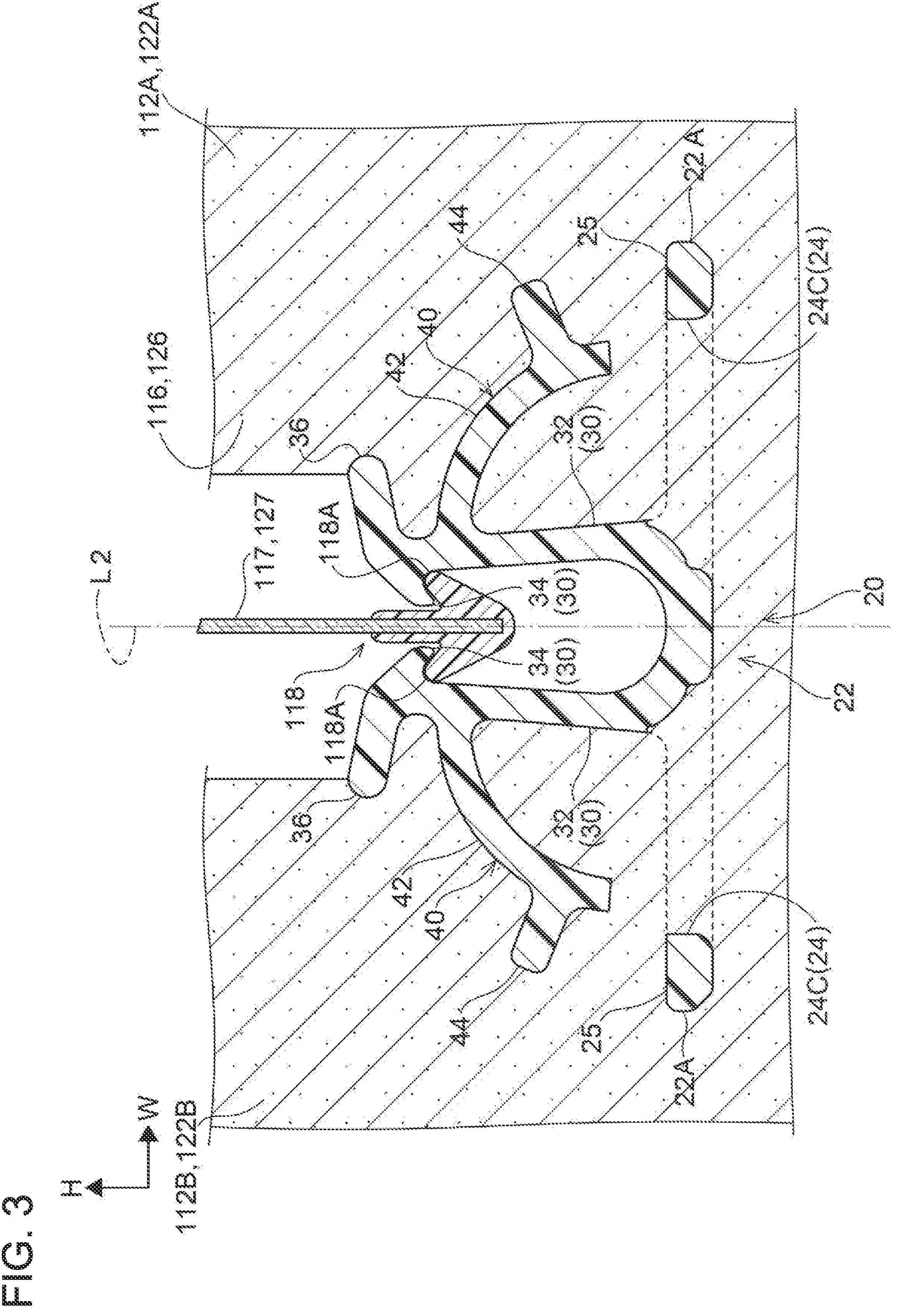
FIG. 3 is a sectional view illustrating a clip of an embodiment of the present disclosure.
Figure 11:
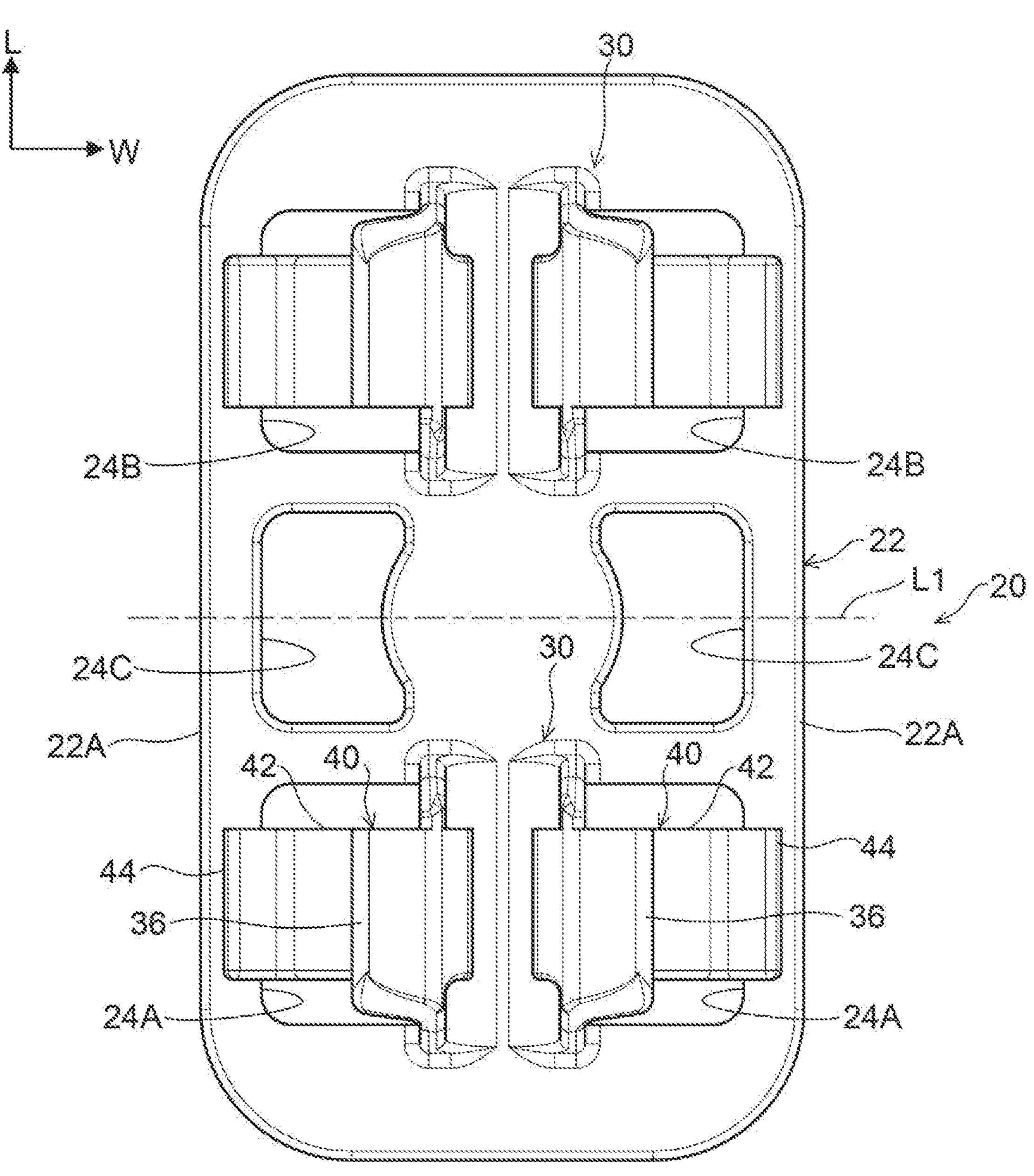
FIG. 11 is a plan view illustrating a clip of an embodiment of the present disclosure.
Figure 12:
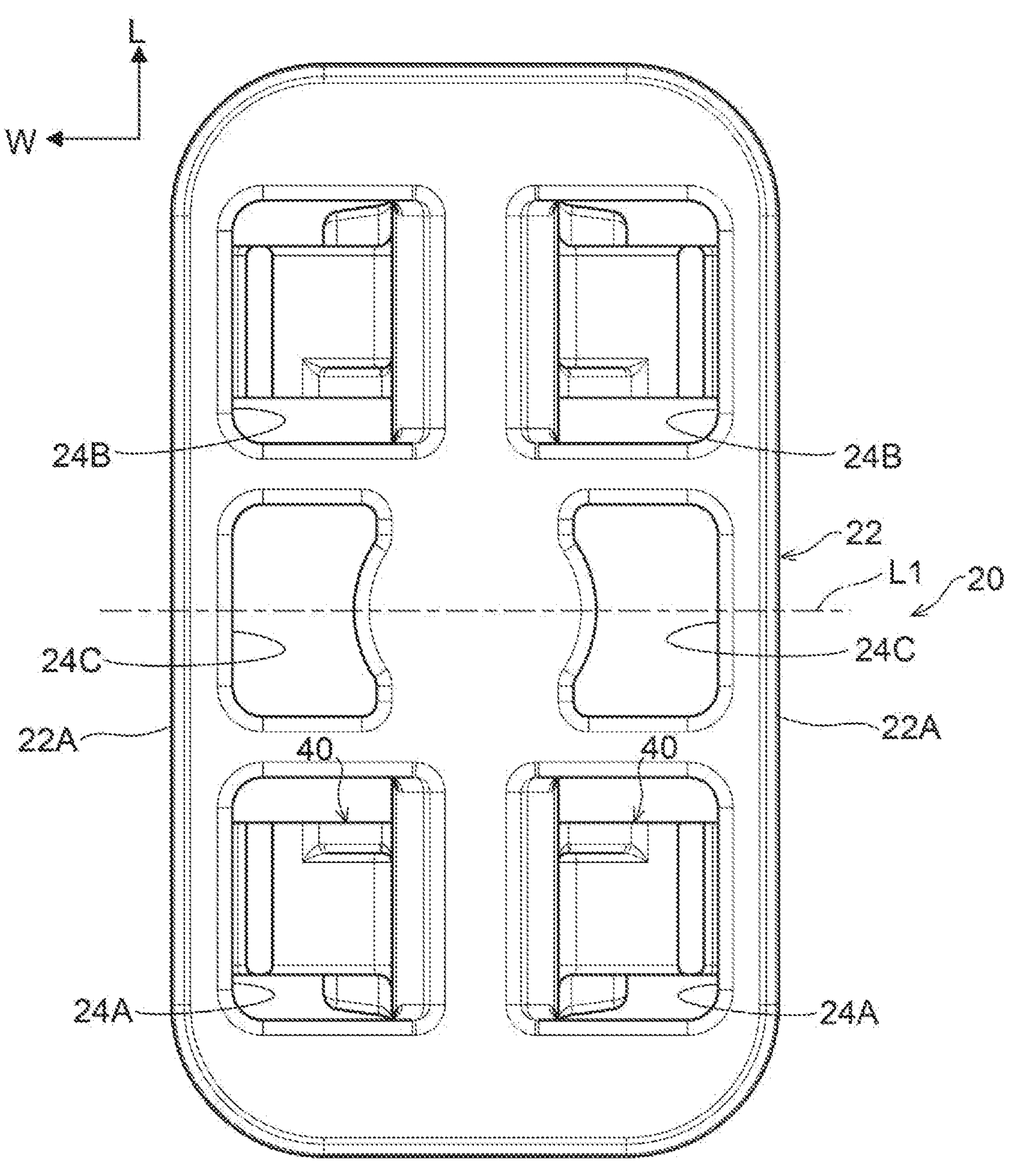
FIG. 12 is a bottom plan view illustrating a clip of an embodiment of the present disclosure.

As illustrated in FIG. 3, the holding portion 30 is a portion that can hold the suspender 118. As illustrated in FIG. 9, two of the holding portions 30 are disposed side-by-side in the front-back direction, standing upward from the surface of the base portion 22. As illustrated in FIG. 11, one of the holding portions 30 and the other holding portion 30 are disposed on either side of the center line L1 in the front-back direction of the base portion 22. On the center line L1 of the base portion 22, a pair of through holes 24C (see FIG. 9) is positioned in the center of the front-back direction among the six through holes 24 (see FIGS. 11 and 12). A pair of through holes 24A positioned on one side of the front-back direction is disposed at both sides of one of the holding portions 30 in the width direction. A pair of through holes 24B positioned on the other side of the front-back direction is disposed at both sides of the other holding portion 30 in the width direction. The holding portions 30 each have approximately the same shape, and thus one holding portion 30 will be described below. Note that the pair of through holes 24C according to the present embodiment is an example of insertion portions of the present disclosure.

As illustrated in FIGS. 4 and 9, the holding portion 30 includes a pair of extension portions 32 and a pair of fastening claws 34.

The pair of extension portions 32 is provided at interval in the width direction of the base portion 22, and each extends in the thickness direction of the base portion 22. Specifically, the pair of extension portions 32 each stands up from the surface of the base portion 22, and is disposed to face each other.

The pair of fastening claws 34 is each provided at the tips of the pair of extension portions 32 and fastens the suspender 118. Specifically, the pair of fastening claws 34 fits and fastens the suspender 118.

The pair of extension portions 32 and the pair of fastening claws 34 are symmetrical with respect to the center line L2 (see FIG. 4) in the width direction of the base portion 22.

The pair of extension portions 32 each extends along the up-down direction. Each of the extension portions 32 is elastically deformable such that each tip side of the extension portions 32 moves away from the center line L2.

The fastening claws 34 are each formed at the tip sides of the extension portion 32 such that the tip sides of the pair of fastening claws 34 are close to each other. Specifically, the tip sides of the fastening claws 34 are formed closer to the center line L2.

In a state where the clips 20 are held in the cushions 112, 122, as illustrated in FIG. 4, the holding portions 30 are disposed in the grooves 116, 126 of the cushions 112, 122, respectively, and the fastening claws 34 are exposed from the foam body to the exterior.

Figure 6:
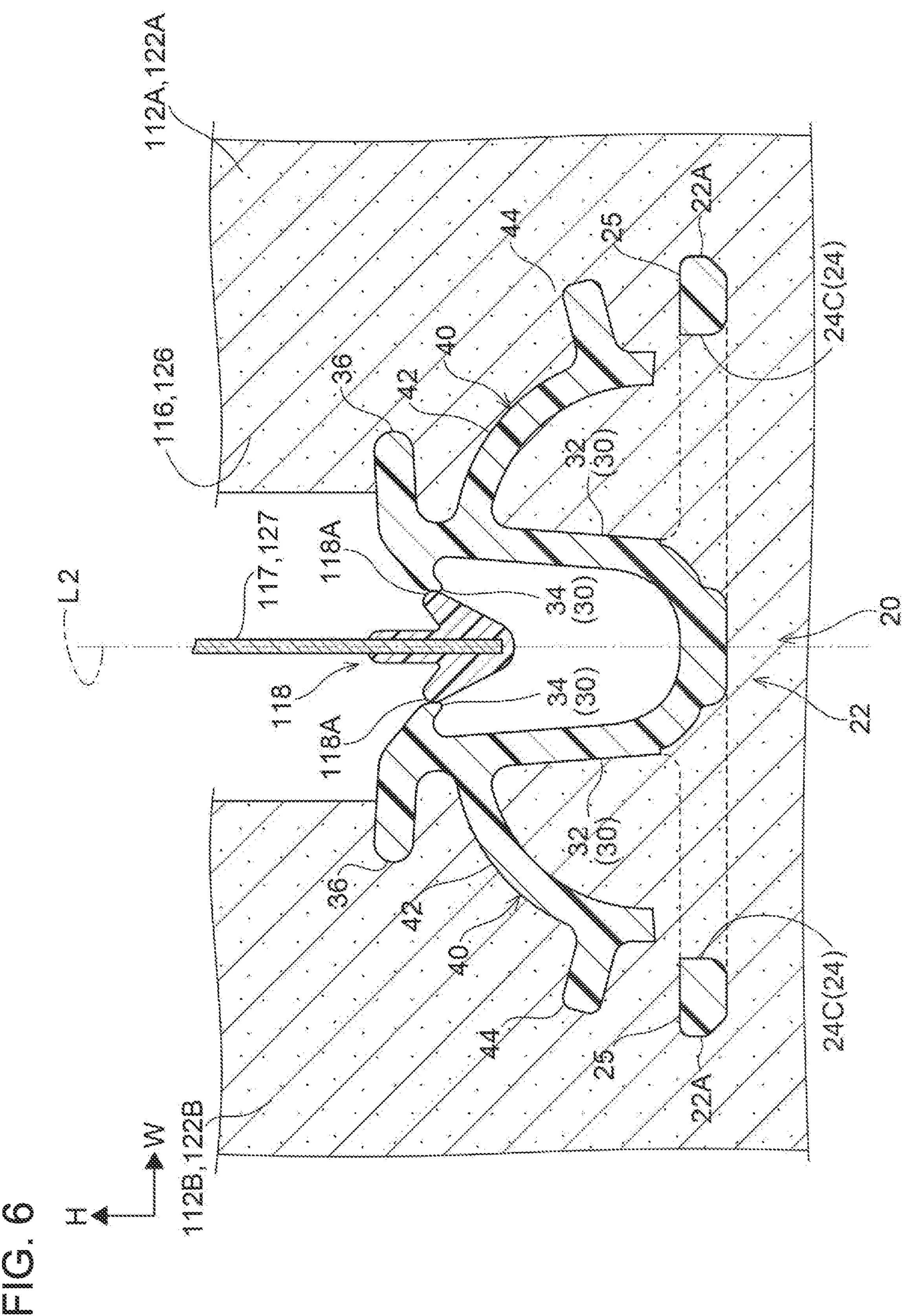
FIG. 6 is a sectional view illustrating a clip of an embodiment of the present disclosure.

When the pair of fastening claws 34 fits and fastens the suspender 118, as illustrated in FIGS. 6 and 7, each of the extension portions 32 is elastically deformed such that the pair of fastening claws 34 moves away from each other.

Projections 36 are each formed on the tip sides of the pair of extension portions 32. As illustrated in FIG. 4, the projections 36 project toward the sides opposite to the sides at which the extension portions 32 face each other (opposite to the sides where the fastening claws 34 are formed).

(Support Portion)

In the clip 20, the support portions 40 are portions that prevent plastic deformation of the extension portions 32 by supporting the extension portions 32 elastically deformed by an external force. The support portions 40 are plate-shaped portions extending outward in the width direction of the base portion 22 of the extension portions 32. Specifically, the support portions 40 extend from the extension portions 32 outward in the width direction and toward the base portion 22. In addition, the support portions 40 each have a curved shape portion 42 curved into an arc shape. The curved shape portion 42 is curved into an arc shape outward in the width direction and toward the base portion 22. The base end portions (i.e., portions connecting with the extension portions 32) of the support portions 40 are positioned at the tip sides of the extension portions 32. In other words, the support portions 40 extend from the tip sides of the extension portions 32 outward in the width direction and toward the base portion 22.

Figure 8:
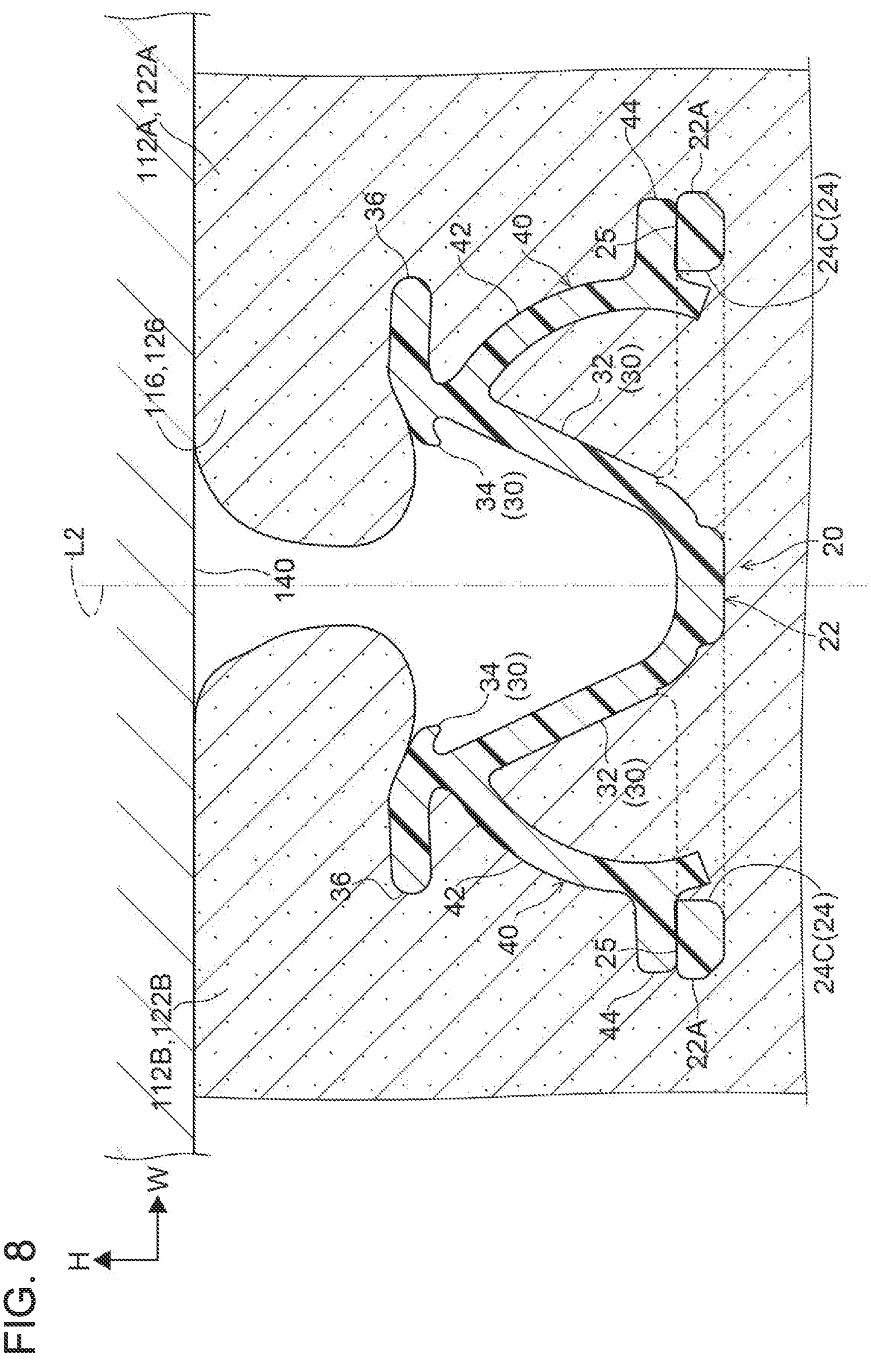
FIG. 8 is a sectional view illustrating a clip of an embodiment of the present disclosure.
Figure 13:
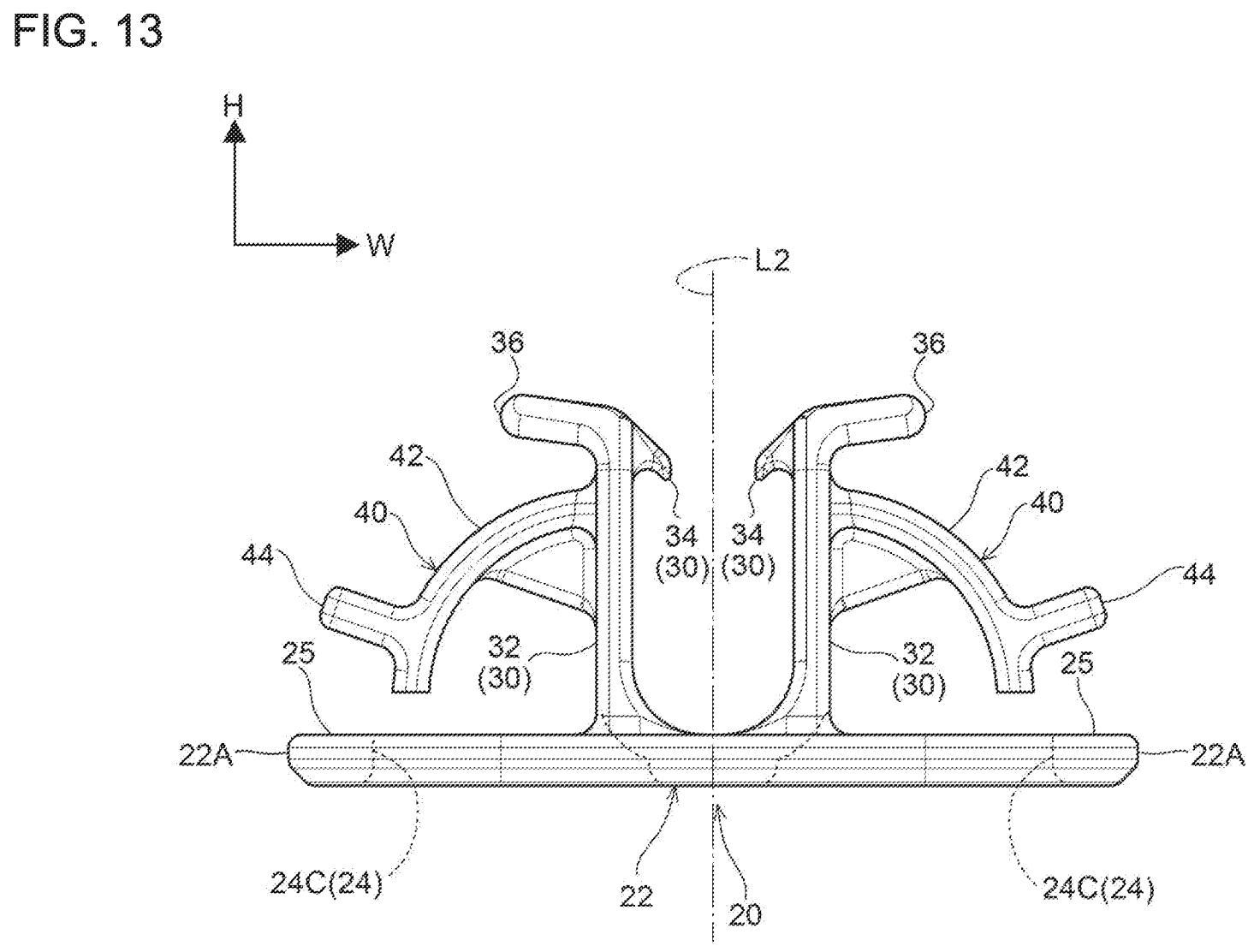

In addition, as illustrated in FIGS. 8 and 13, the tip sides of the support portions 40 have engaging portions 44 to be engaged with edge portions 25 of the through holes 24C in the base portion 22. The engaging portions 44 are projections projecting from the tip sides of the support portions 40 outward in the width direction. When the extension portions 32 are bent (i.e., elastically deformed) outward in the width direction, the engaging portions 44 contact the base portion 22 to support the extension portions 32. Specifically, as illustrated in FIG. 8, when the extension portions 32 are bent outward in the width direction, the tips of the support portions 40 are inserted into the through holes 24C and the engaging portions 44 contact the edge portions 25 of the through holes 24C to support the extension portions 32. Note that the edge portions 25 of the through holes 24C are an example of engaged portions provided at the outsides of the through holes 24C in the width direction as an example of insertion portions into which the tips of the support portions 40 are inserted. The present disclosure is not limited to this configuration. For example, recessed portions may be provided at the base portion 22, as an example of the insertion portions.

In a state where the clip 20 is held in the cushions 112, 122, areas among the extension portions 32, the base portion 22, and the support portions 40 has been filled with the foam body.

When the extension portions 32 are elastically deformed such that the pair of fastening claws 34 moves away from each other (see FIGS. 5 and 6), as illustrated in FIG. 8, the engaging portions 44 of the support portions 40 contact (specifically, surface contact) the edge portions 25 of the through holes 24C of the base portion 22 to prevent deformation of the extension portions 32.

Next, effects of the clip 20 will be described by the following: a deformed state of the clip during roller crushing on the cushions 112, 122; a process of attaching the suspender 118, fixed to the sheet members 117, 127 attached to the covers 114, 124 respectively, to the clip 20; and a deformed state of the clip 20 in a case where an excess pulling-out force acts on the clip 20 at a deployment of the airbag 132.

(Roller Crushing)

FIG. 8 illustrates a deformed state of the clip 20 when roller crushing is performed on the cushions 112, 122 by a pair of rollers 140 (only one roller is illustrated in FIG. 8) after demolding. As illustrated in FIG. 8, when the cushions 112, 122 are sandwiched between the pair of rollers 140, the pressure from the pair of rollers 140 causes the extension portions 32 to bend (i.e., to be elastically deformed) outward in the width direction. When the extension portions 32 are bent, the engaging portions 44 of the support portions 40 contact the edge portions 25 of the base 22, whereby the support portions 40 support the extension portions 32. In this manner, the contact of the engaging portions 44 of the support portions 40 with the edge portions 25 of the base portion 22 prevents bending deformation of the extension portions 32, and thus preventing plastic deformation and damage of the extension portions 32 of the clip 20 during the roller crushing of the cushions 112, 122.

(Attachment Process)

Figure 5:
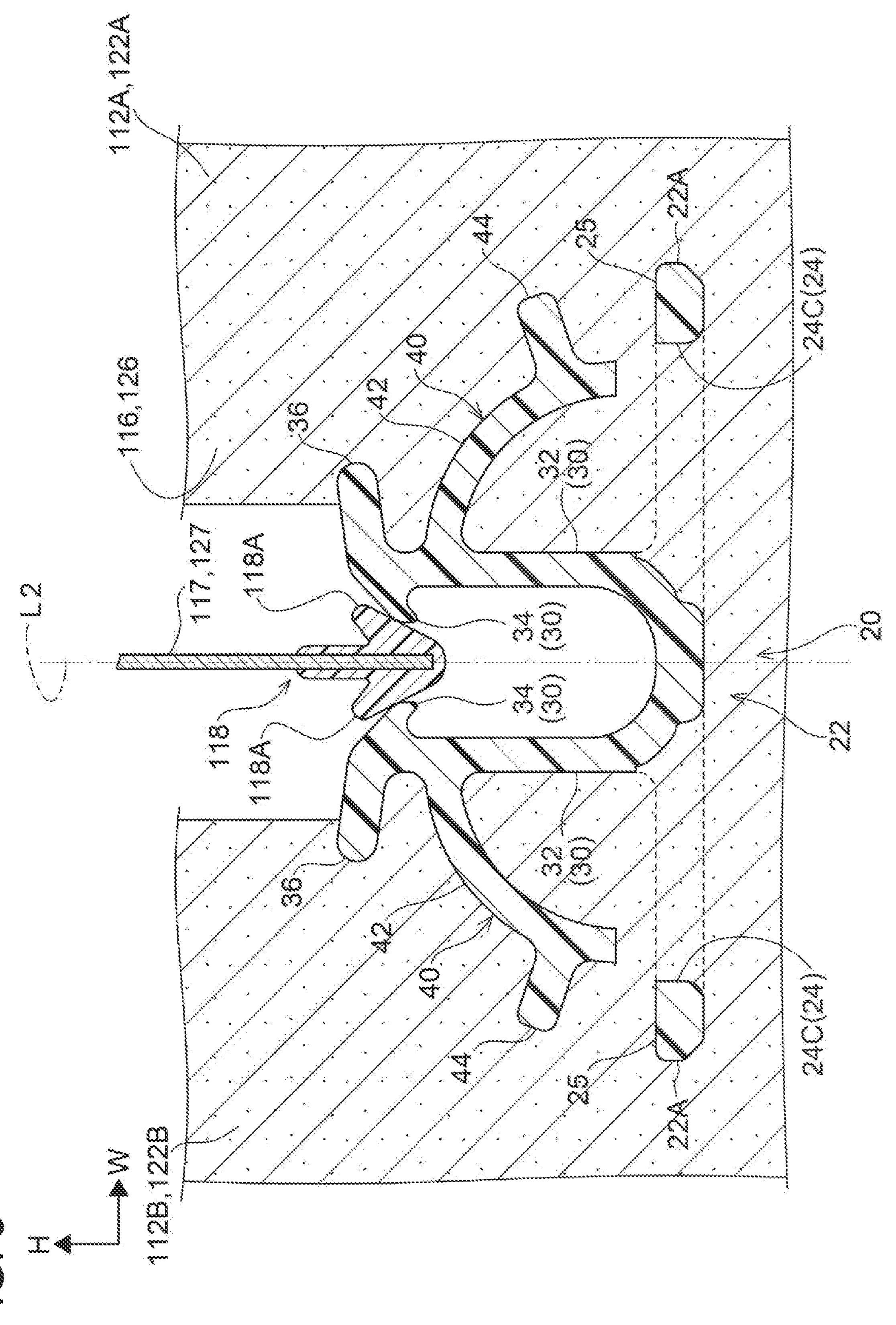
FIG. 5 is a sectional view illustrating a clip of an embodiment of the present disclosure.

In order to attach the suspender 118 to the clip 20, as illustrated in FIG. 5, the suspender 118 is inserted into the grooves 116, 126. The insertion of the suspender 118 into the grooves 116, 126 causes the tip portion, which is tapered, of the suspender 118 to contact the pair of fastening claws 34.

Further, as illustrated in FIG. 6, when the suspender 118 is inserted toward the bottoms of the grooves 116, 126, the pair of fastening claws 34 is pressed by the suspender 118 and the extension portions 32 are elastically deformed such that the pair of fastening claws 34 moves away from each other. This allows the suspender 118 to pass between the pair of fastening claws 34. On this occasion, there is no contact of the engaging portions 44 of the support portions 40 with the edge portions 25 of the base portion 22, which forms a gap.

As illustrated in FIG. 7, when the projections 118A of the suspender 118 have passed between the pair of fastening claws 34, the extension portions 32 resiliently return and the pair of fastening claws 34 fits and fastens the suspender 118. This allows the suspender 118 to be attached to the clip 20.

In this manner, the attachment process of attaching the suspender 118 to the clip 20 is completed.

(During Airbag Rolling Open)

Figure 2:
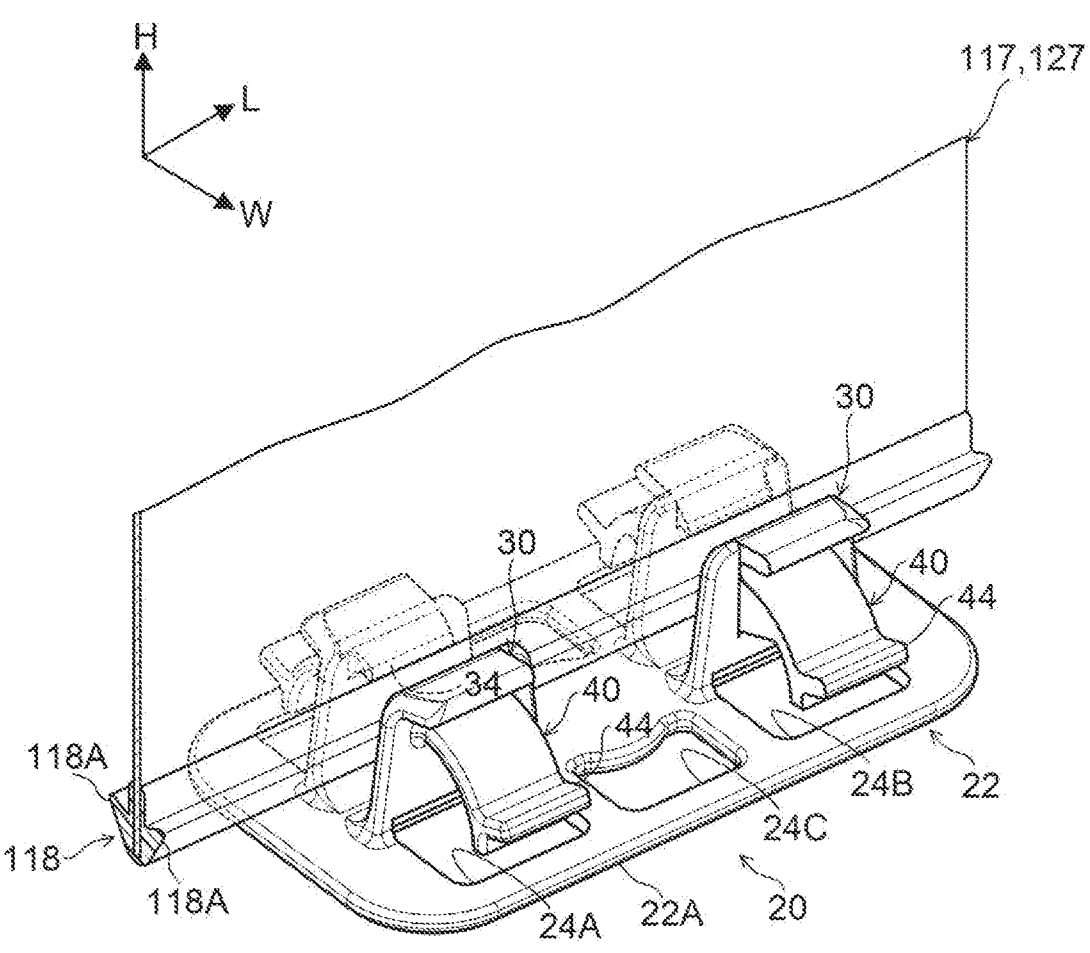
FIG. 2 is a perspective view illustrating a clip of an embodiment of the present disclosure.

FIGS. 2 and 7 illustrate a state of the suspender 118 attached to the clip 20 with no pulling-out force acting on the clip 20.

However, when the airbag 132 (see FIG. 14) is deployed for some reason, the airbag 132 presses the cover 124 from the inside of the seat 100. As illustrated in FIGS. 1 and 3, when the airbag 132 presses the cover 124, the suspender 118 moves upward. The upward movement of the suspender 118 causes the projections 118A of the suspender 118 to press the fastening claws 34 of the holding portion 30, whereby the holding portion 30 is raised upward. This generates a force to pull the clip 20 out of the cushions 112, 122 upon the clip 20.

As illustrated in FIG. 3, the extension portions 32 of the clip 20 are provided with the support portions 40 for preventing damage of the extension portions 32. Thus, the foam body easily enters between the extension portions 32 and the base portion 22 as compared to, for example, a configuration in which upstanding portions for preventing damage of the extension portions are provided on the base portion. Therefore, in the clip 20, a sufficient amount of the foam body enters areas surrounded by the extension portions 32, the base portion 22, and the support portions 40, thereby increasing the force with which the base portion 22 is held in the foam body (cushions 112, 122). That is, the clip 20 is prevented from getting out of the foam body.

In addition, the foam body enters the through holes 24A, 24B, and 24C of the base portion 22, thereby further preventing the clip 20 from getting out of the foam body.

Furthermore, in the clip 20, the foam body easily enters between the extension portions 32 and the base portion 22, specifically the areas surrounded by the extension portions 32, the base portion 22, and the support portions 40, through the through holes 24C provided in the base portion 22. This further prevents the clip 20 from getting out of the foam body.

In the clip 20, the support portions 40 each have the curved shape portion 42, which allows the curved shape portion 42 to disperse the force direction of an external force acting on the support portions 40 as the support portions 40 contact the base portion 22. This prevents plastic deformation and damage of the extension portions 32 even if the external force acting on the support portions 40 is large.

In the clip 20, the base end portions of the support portions 40 are positioned at the tip sides of the extension portions 32. Thus, the areas surrounded by the extension portions 32, the base portion 22, and the support portions 40 are wider than, for example, that in a configuration in which the base end portions of the support portions 40 are positioned at the base end sides of the extension portions 32. This allows more foam body to easily enter among the extension portions 32, the base portion 22, and the support portions 40. This further prevents the clip 20 from getting out of the foam body.

The clip 20 has through holes 24A and 24B at both outer portions in the width direction of the holding portions 30 on the base portion 22. Thus, the amount of resin in the base portion 22 can be reduced as compared to, for example, a configuration in which upstanding portions are provided in both outer portions. This reduces the weight of the clip 20, thereby reducing the weight of a vehicle seat including the clip 20. The use of such lightweight vehicle seats can improve the fuel consumption of vehicles.

While the present disclosure has been described in detail with respect to the specific embodiment, the present disclosure is not limited to the embodiment, and it is obvious to a person skilled in the art that various other embodiments can be made within the scope of the present disclosure. For example, the number of the holding portions 30 in the clip 20 in the above embodiment is two, which may be three or more.

In the above embodiment, the clip 20 is described as an example where the clip 20 is about to get out of the cushions 112, 122 by pressing the cover 124 during deployment of the airbag 132, but the present disclosure is not limited to this configuration. It is sufficient that the force described above is generated on the clip 20 even if the airbag 132 is not deployed.

In the above embodiment, the clip 20 is described as an example where the clip 20 is used in the seat 100 for vehicles, but the present disclosure is not limited to this configuration. The clip 20 may be used in another seats (chairs), such as office chairs, sofas for homes, or legless chairs.

In relation to the above embodiment, the following Supplementary Descriptions are further disclosed.

(Supplementary Description 1)

A cover fastening clip according to Supplementary Description 1 includes a plate-shaped base portion that is embedded in a foam body and held in the foam body, a pair of extension portions that is provided at interval in a width direction of the base portion and extends in a thickness direction of the base portion, a fastening portion that is provided at each tip of the pair of extension portions and fastens a fastened portion provided at a cover for covering the foam body, and support portions that extend from the extension portions outward in the width direction of the base portion and contact the base portion to support the extension portions when the extension portions are bent outward in the width direction.

In a state where the cover fastening clip according to Supplementary Description 1 is held in the foam body, for example, when an external force acts on the extension portions by roller crushing, the extension portions are bent outward in the width direction of the base portion, the support portions contact the base portion, and the extension portions are supported by the support portions. In this manner, in the cover fastening clip, the contact of the support portions with the base portion prevents bending deformation of the extension portions, and thus preventing plastic deformation and damage of the extension portions during the roller crushing of the foam body.

The cover fastening clip according to Supplementary Description 1 is provided with the support portions in the extension portions for preventing damage of the extension portions. Thus, the foam body easily enters between the extension portions and the base portion as compared to, for example, a configuration in which upstanding portions for preventing damage of the extension portions are provided on the base portion. Therefore, in the above cover fastening clip, a sufficient amount of the foam body enters areas surrounded by the extension portions, the base portion, and the support portions, thereby increasing the force with which the base portion is held in the foam body. That is, the cover fastening clip is prevented from getting out of the foam body.

(Supplementary Description 2)

In the cover fastening clip according to Supplementary Description 2, in the cover fastening clip according to Supplementary Description 1, the base portion includes insertion portions into which tips of the support portions are inserted, and engaged portions provided at outsides in the width direction of the insertion portions, and the support portions include engaging portions to be engaged with the engaged portions at tip sides of the support portions.

In the cover fastening clip according to Supplementary Description 2, the foam body enters the insertion portions of the base portion to further prevent getting out of the foam body.

(Supplementary Description 3)

In the cover fastening clip according to Supplementary Description 3, in the cover fastening clip according to Supplementary Description 2, the insertion portions are through holes provided at the base portion.

In the cover fastening clip according to Supplementary Description 3, the foam body easily enters between the extension portions and the base portion, specifically the areas surrounded by the extension portions, the base portion, and the support portions, through the through holes as the insertion portions provided in the base portion. This further prevents the above cover fastening clip from getting out of the foam body.

(Supplementary Description 4)

In the cover fastening clip according to Supplementary Description 4, in the cover fastening clip according to any one of Supplementary Descriptions 1 to 3, the support portions each have a curved shape portion.

In the cover fastening clip according to Supplementary Description 4, the support portions each have the curved shape portion, which allows the curved shape portion to disperse the force direction of the external force acting on the support portions as the support portions contact the base portion. This prevents plastic deformation and damage of the extension portions even if the external force acting on the support portions is large.

(Supplementary Description 5)

In the cover fastening clip according to Supplementary Description 5, in the cover fastening clip according to any one of Supplementary Descriptions 1 to 4, base end portions of the support portions are positioned at tip sides of the extension portions.

In the cover fastening clip according to Supplementary Description 5, the base end portions of the support portions are positioned at the tip sides of the extension portions. Thus, the areas surrounded by the extension portions, the base portion, and the support portions are wider than, for example, that in a configuration in which the base end portions of the support portions are positioned at the base end sides of the extension portions, and more foam body easily enters among the extension portions, the base portion, and the support portions. This further prevents the above cover fastening clip from getting out of the foam body.

The disclosure of Japanese Patent Application No. 2021-191596 filed on Nov. 25, 2021 is hereby incorporated by reference in their entirety.

All publications, patent applications, and technical standards described in the present specification are herein incorporated by reference to the same extent as a case where each individual publication, patent application, or technical standard was specifically and individually indicated to be incorporated by reference.

What is claimed is:

1. A cover fastening clip comprising:

a plate-shaped base portion configured to be embedded in a foam body and held in the foam body;

a pair of extension portions provided at interval in a width direction of the base portion and extending in a thickness direction of the base portion;

fastening portions, each being provided at each tip of the pair of extension portions, configured to fasten a fastened portion provided at a cover for covering the foam body; and support portions, each extending from each of the extension portions outward in the width direction of the base portion, contacting the base portion to support the extension portions when the extension portions are bent outward in the width direction, wherein the base portion comprises insertion portions into which a part of the support portions are inserted, and engaged portions provided at one side in the width direction of the insertion portions, and the support portions comprise engaging portions to be engaged with the engaged portions at a side of the one side of the support portions.

2. A cover fastening clip comprising:

a plate-shaped base portion configured to be embedded in a foam body and held in the foam body;

a pair of extension portions provided at interval in a width direction of the base portion and extending in a thickness direction of the base portion;

fastening portions, each being provided at each tip of the pair of extension portions, configured to fasten a fastened portion provided at a cover for covering the foam body; and support portions, each extending from each of the extension portions outward in the width direction of the base portion, contacting the base portion to support the extension portions when the extension portions are bent outward in the width direction, wherein the base portion comprises insertion portions into which tips of the support portions are inserted, and engaged portions provided at outsides in the width direction of the insertion portions, and the support portions comprise engaging portions to be engaged with the engaged portions at tip sides of the support portions.

3. The cover fastening clip according to claim 2, wherein each of the insertion portions is a through hole provided at the base portion.

4. The cover fastening clip according to claim 1, wherein the support portions each have a curved shape portion.

5. The cover fastening clip according to claim 1, wherein each of a base end portion of the support portion is positioned at a tip side of each of the extension portions.

* * * * *